United States Patent [19]
Bloom et al.

[11] Patent Number: 5,194,343
[45] Date of Patent: Mar. 16, 1993

[54] METHOD OF ELECTRODE FABRICATION AND AN ELECTRODE FOR METAL CHLORIDE BATTERY

[75] Inventors: Ira D. Bloom, Bolingbrook; Paul A. Nelson, Wheaton; Donald R. Vissers, Naperville, all of Ill.

[73] Assignee: The United States of America as represented by the United States Department of Energy, Washington, D.C.

[21] Appl. No.: 594,485

[22] Filed: Oct. 9, 1990

[51] Int. Cl.$^5$ .............................................. H01M 4/00
[52] U.S. Cl. .................................. 429/218; 429/221; 429/223; 429/224; 429/103
[58] Field of Search ............... 429/218, 221, 223, 224, 429/103

[56] References Cited

U.S. PATENT DOCUMENTS

| | | | |
|---|---|---|---|
| 3,847,667 | 11/1974 | Werth | 429/103 |
| 4,288,506 | 9/1981 | Coetzer et al. | 429/199 |
| 4,546,055 | 10/1985 | Coetzer et al. | 429/103 |
| 4,592,969 | 6/1986 | Coetzer et al. | 429/50 |
| 4,626,483 | 12/1986 | Bones et al. | 429/223 |
| 4,659,637 | 4/1987 | Nelson et al. | 429/104 |
| 4,973,534 | 11/1990 | Adendorff et al. | 429/223 |

OTHER PUBLICATIONS

Bloom et al., "Design Considerations for the Development of Advanced Sodium/Metal Chloride Cells", Intersoc. Energy Conversion Eng. Conf., Aug. 1990.
Bloom et al., "Effect of Some Design Parameters on the Performance of NiCl$_2$ Electrodes", 176th Electrochemical Soc. Mtg., Oct. 1989, p. 145.
Redey et al., "Investigations of Ni/NiCl$_2$ Electrodes in Basic Chloroaluminate Melt", Id. at p. 143.
Vissers et al., "Advanced Sodium/Metal Chloride Cell Research", Contractor's Conference, Nov. 1989.
Dell and Bones, "The Sodium/Metal Chloride Battery", 22nd Intersociety Energy Conversion Engineering Conference, Aug. 1987.
Nelson, "Modeling of Sodium/Metal Chloride Batteries", Proceedings of the 24th Intersociety Energy Conversion Engineering Conf., Aug. 1989.
Bones et al., "A Sodium/Iron(II) Chloride Cell with a Betal Alumina Electrolyte", Journal of the Electrochemical Society, Oct. 1987.

*Primary Examiner*—R. Bruce Breneman
*Attorney, Agent, or Firm*—Hugh W. Glenn; Robert J. Fisher; William R. Moser

[57] ABSTRACT

A method of fabricating an electrode for use in a metal chloride battery and an electrode are provided. The electrode has relatively larger and more uniform pores than those found in typical electrodes. The fabrication method includes the steps of mixing sodium chloride particles selected from a predetermined size range with metal particles selected from a predetermined size range, and then rigidifying the mixture. The electrode exhibits lower resistivity values of approximately 0.5 $\Omega cm^2$ than those resistivity values of approximately 1.0–1.5 $\Omega cm^2$ exhibited by currently available electrodes.

16 Claims, No Drawings

METHOD OF ELECTRODE FABRICATION AND AN ELECTRODE FOR METAL CHLORIDE BATTERY

CONTRACTUAL ORIGIN OF THE INVENTION

The United States Government has rights in this invention pursuant to Contract No. W-31-109-ENG-38 between the U.S. Government and Argonne National Laboratory.

BACKGROUND OF THE INVENTION

1. Field of the Invention

This invention relates to a cathode and a method of fabricating cathodes for metal chloride batteries and, more particularly, of fabricating cathodes for metal chloride batteries by regulating particle sizes of the constituents in the electrode fabrication mixture.

2. Background of the Invention

The attractiveness of using electrochemical devices, such as sodium-sulfur and sodium-metal chloride (Na/MCl$_2$) batteries, as an alternative to petroleum engines continues to increase in vogue.

The ideal battery should exhibit a number of characteristics, including low resistance and high discharge rates, operation over a wide temperature range, a capability to operate over a large number of cycles, and high energy on a volume, weight and cell basis.

Battery cells consist of two dissimilar metals in an ionically conductive medium, with the ionization potential of one metal sufficiently higher than the other metal so as to yield a voltage upon reduction/oxidation (redox) coupling above that needed to break down the electrolyte continuously at the positive electrode.

Metal typically goes into solution at the negative electrode, or anode, releasing electrons to travel in the external circuit to the positive electrode, or cathode, doing work during the transit. Material which will go through a valency drop on electrochemical discharge is included in the positive electrode. In essence, this material, the oxidizer, accepts electrons coming from the negative electrode and serves as the depolarizer. The depolarizer or cathode is positioned in the positive electrode in combination with some electron-carrying matrix, and should be porous to allow access of the electrolyte to a large area of the depolarizer. Porosity of the cathode is key as it affords greater electrode surface area and therefore a larger redox reaction surface.

The economic and social advantages of powering automobiles from batteries are considerable as the vehicles could operate at relatively high efficiencies, such as 30 percent to 40 percent, and be non-polluting. In comparison, the internal combustion engine in an automobile typically converts 10 to 15% of the energy in gasoline to motive power. Two important variables are considered in seeking an energy storage system for a vehicle. One of the variables, specific power, designated watts per kilogram (W/kg), determines to a large extent acceleration and speed capabilities. The other variable, specific energy, designated as watt-hours per kilogram (Wh/kg), determines vehicle range. The capacity density of a cell, or how much electrical energy the electrode will contain per unit volume, is designated as ampere-hours per cubic centimeter (Ah/cm$^3$).

High power capability is theoretically achievable by use of low resistance materials and by operation at elevated temperatures which increases the charge-current density. The benefits of high temperature operation are not achieved without cost, however. For example, a large increase in solute, up to 25 percent when electrolyte salts melt, poses a design problem.

The sodium/sulfur cell has received a great deal of publicity among the high temperature rechargeable battery genre, perhaps due to its lightweight, inexpensive and compact design. This system uses the solid electrolyte beta-alumina, including $\beta$-alumina, $\beta'$-alumina and $\beta''$-alumina, that has a very high conductivity attributable to highly mobile sodium ions in cleavage planes. These cells suffer from several problems, however, including the accumulation of metallic sodium in the grain boundaries of the beta alumina, which causes shorts and also weakens the separator material. There is also a tendency of the beta alumina to lose sodium after long periods at the high operating temperatures of these cells.

Sodium/metal chloride cells are disclosed in U.S. Pat. No. 4,288,506. These cells use a sodium anode, a $\beta''$-alumina solid electrolyte and a MCl$_2$ cathode with a catholyte of NaAlCl$_4$.

Metal halide batteries exploit the higher electrolysis threshold values of electrolyte constituents to electrode constituents. During charging, the electrolyte phase becomes poorer in sodium salt with sodium metal being deposited on the anode and the halogen reacting with the reduced metal to form a metal halide. Among halides, fluorides and chlorides exhibit higher electrolysis thresholds than bromides and iodides. As such, metal chloride and metal fluoride systems exhibit relatively higher energy density and lighter mass than systems using bromides and iodides.

As with other electrochemical cells, metal halide batteries generate electricity by transporting electrons from the fuel constituent to the oxidizer, with concomitant oxidation and reduction occurring at the anode and cathode, respectively.

The following reaction occurs:

$$MX_2 + 2\,Na \rightleftharpoons 2\,NaX + M$$

where M is a metal such as nickel, iron, cobalt, chromium and manganese and X is a halogen such as fluorine, chlorine, bromine and iodine. The left hand side of the above equation depicts a charged state, before reduction of the metal halide, with the right hand side of the equation depicting a discharged state with reduced metal.

Utilization of the metal-chloride system is usually expressed on the basis of the ratio of the reacted NaCl to the total quantity of NaCl used to fabricate the positive electrode. This practice is convenient for the Na/MCl$_2$ cells because they are fabricated in the discharged state and the MCl$_2$ active material is formed electrochemically, as noted in the above cell reaction.

Despite the high theoretical specific energy of Na/MCl$_2$ cells, specifically 790 Wh/kg for Na/NiCl$_2$ designs, the present state-of-the-art Na/MCl$_2$ battery exhibits specific energies of approximately 120 to 150 Wh/kg. Low specific energies may be due to an inefficient use of metal in the positive electrode. Indeed, only 25 percent to 33 percent of nickel in a NiCl$_2$ electrode is used in the redox reaction. Na/MCl$_2$ batteries also have exhibited limited power, of approximately 100 W/kg, probably because of the high resistivity and subsequent voltage loss of typical metal chloride electrodes.

These high resistivities and voltage losses occur due to inefficient redox reactions at the cathode. This inefficiency may be from a paucity of ion exchange between the anolyte and catholyte which often results from overcharging whereby in some of the $AlCl_4^-$ catholyte is found $AlCl_3$. A subsequent transition metal halide forms, for example, $FeCl_3$, which attacks the beta-alumina barrier as a Lewis acid. The products of this acid-base reaction at the beta-alumina interface can block free passage of sodium ions through the solid electrolyte. Some alteration of this inefficient ion exchange can be effected by keeping $AlCl_3$ formation to a minimum with the addition of sodium fluoride, as disclosed in U.S. Pat. No. 4,592,969.

Inhibition of sodium through the beta-alumina also can be stymied by maintaining the oxidation state of the metal as low as possible through careful regulation of sodium and aluminum ions in the initial mixture. This technique, disclosed in U.S. Pat. No. 4,546,055, strives to keep the metal halides as close to the cathode surface as possible by inhibiting their solubility in the liquid electrolyte material.

Aside from manipulating the constituents of the catholyte to improve redox efficiencies, a restructuring of the cathode itself is feasible. Prior techniques, disclosed in U.S. Pat. No. 4,288,506, incorporate carbides to improve the skeletal structure of the cathode.

Despite performance calculations indicating that specific power and specific energy greater than 500 W/kg and 200 Wh/kg can be achieved, $MCl_2$ technology is not approaching these values partly because current cell design has mimicked older sodium/sulfur cell fabrication techniques. Metal chloride cells typically consist of a single tubular solid electrolyte made of beta alumina about 5 centimeters in diameter. Within the solid electrolyte is a thick positive electrode and $NaAlCl_4$, acting as a secondary liquid electrolyte. The metal chloride in Cheetah cell designs is made from a mixture of sodium chloride and excess metal. This mixture is either poured into the beta alumina tube or pressed into disks. Electrodes made in this fashion are about 6 to 20 volume percent metal and have a capacity density of about 0.2 to 0.3 $Ah/cm^3$ and are about 2 to 2.5 mm. thick. The topographies of these electrodes have pore diameters of 10 to 30 microns ($\mu m$), and thick configurations which inherently exhibit low energy capacity and moderate resistivity. These cells have area specific resistance ($ASI_{15sec}$) values of about 4 to 6 $\Omega cm^2$. These thick designs as well as random selection of metal and sodium chloride particle sizes is partially responsible for the lower than expected specific power and specific energy data derived from these designs.

As the metallic fraction of the electrode typically exhibits a very low resistance, the bulk of the resistance for the positive electrode must result from transfer of sodium ions through the electrolyte and diffusion at the solid surfaces in the interior of the electrode. Increasing the utilization of existing metal in cathode structures, in effect lowering the capacity ratio, will result in as yet unattainable decreases in resistance. Therefore, an alternative to the above methods to increase redox efficiencies is a systematic approach to creating larger and more uniform pores in the cathode structure. The present invention shows that electrode constituent prefabrication particle sizes have a marked effect on electrode performance. The invention fulfills a need for a method of increasing the fraction of metal actually used in the redox reaction, and therefore increasing the specific performance values of cells, through the development and fabrication of thin, large surface area, high capacity density electrodes in metal chloride cells.

SUMMARY OF THE INVENTION

It is an object of the present invention to provide a method for overcoming many of the disadvantages of the approaches or methods of the prior art.

It is another object of the present invention to provide a method for fabricating electrodes for use in metal chloride batteries. A feature of the present invention is regulating the size of sodium chloride particles during the fabrication process. An advantage of the present invention is that upon charging, the concomitant redox reaction consumes sodium chloride particles to leave relatively uniform and large sized pores to accommodate metal chloride formation and facilitate electrolyte access to the electrode surface.

Another object of the present invention is to provide a method of fabricating cathodes in metal chloride batteries. A feature of the present invention is incorporating certain sized metal particles into the fabrication process. An advantage of the present invention is an increase in surface area of the cathodes with a subsequent decrease in resistance and an increase in specific power rendered by the cathode.

Yet another object of the present invention is a cathode of a metal chloride battery. A feature of the invention is a relatively thin cathode with large and uniform pores. An advantage of the present invention is increased access for the electrolyte to contact the cathode thereby increasing the specific energy of the electrode involved in the electrochemical process.

In brief, the objects and advantages of the present invention are achieved by a metal chloride battery positive electrode and a method of fabricating a positive electrode. Metal particles selected from a predetermined size range are mixed with sodium chloride particles selected from a predetermined size range. The mixture is then rigidified to form the electrode.

DETAILED DESCRIPTION OF THE INVENTION

Sodium/metal-chloride cells and batteries are viable alternatives to Carnot systems for energy storage and transportation applications. It has been learned that electrode constituent particle sizes have the greatest effect on utilization and on lessening voltage losses, i.e., the ASI, in $Na/MCl_2$ cell cathodes.

In accordance with a feature of the present invention, the reduction/oxidation reaction between an alkali-metal halide and a metal is used to create a cathode with extremely high surface area characteristics. Selected particle sizes of cathode constituents incorporated into the electrode fabrication process greatly increases electrode surface area. Increased cathode surface area corresponds to higher utilization of metal which is proportional to higher specific performance values of the cell.

Generally, in fabricating high specific energy cathodes, metal particles of a predetermined size are first combined with unsized alkali-metal halides. Conversely, alkali-metal particles of a predetermined size are mixed with unsized metal particles. This initial mixing causes the metal particles to channel between the sodium chloride particles. A myriad of metal particle morphologies can be used, including, but not limited to, spheres, chains, spikes, filaments and combinations thereof. Aside from forming continuous metal channels, mixing also allows the metal to surround the sodium chloride particles.

In a second fabrication step the mixture is sintered or compressed into an electrode configuration so as to create a somewhat rigid, thin electrode. The mixture is rigidified after the metal particles coalesce together during sintering and then cool into a hard network of metal. It is noted that as radial thickness of the positive electrode is decreased, there is a marked decrease in resistance. The specific power of the cells also improves by increasing the ratio of solid electrolyte area to cell capacity which results in thinner positive electrodes. The above two fabrication steps are performed with the electrodes in an uncharged state.

In a post-fabrication step, porosity is created during the first charge as the alkali-metal halide is consumed. It was found that the use of larger alkali-metal halide particles resulted in larger pores being created. This porosity accommodates the expansion which takes place when reduced metal is oxidized to metal halide.

Porosity also facilitates subsequent electrochemical cycling. Cycling is defined by the rate of charge or discharge. Charge or discharge rate is expressed in amperes as the battery's rated capacity divided by a time factor. This time factor is the amount of time during which the battery is cycled. Rate of charge is expressed by the following equation:

$$I = C/T$$

where I is the rate of charge or discharge expressed in amperes, C is the battery's rated capacity expressed in ampere hours and T is the cycle time period expressed in hours. As an example, if a fully charged battery with a capacity of 80 ampere hours is totally discharged in 10 hours, then the rate of discharge is 8 amperes or a C/8 discharge rate.

Aside from regulating the particle size of just one cathode constituent, porosity is also regulated by selecting certain size metal particles in relation to certain size alkali-metal halide particles. Table 1 below shows the effects on NaCl utilization, ASI, and capacity density when various size nickel particles are mixed with various size sodium chloride particles.

+200 (74–149 μm −200 to +230 (62–74 μm), −230 to 270 (53–63 μm), and −270 to +325 (44–53 μm). In one example, noted in Table 1, an electrode produced from NaCl particles selected from the −60 to +100 mesh size range, exhibited ASI values of about 0.5 $\Omega cm^2$ at 300° C. This particular electrode exhibited an ASI value of approximately 0.7 $\Omega cm^2$ at approximately 260° C.

Ultimately electrode pore sizes range from about 50 μm to about 500 μm, depending on the NaCl particle size used, with an average around 100–150 μm in size. This compares to the present electrodes which have pore diameters of 10–30 μm.

The new electrodes also can be made using submicron to 100 μm metal particles and NaCl particles that are −60 to +100 mesh (149≈250 μm) in size. In a low-capacity density $NiCl_2$ electrode (0.1–0.25 Ah/cm3), the utilization of NaCl in electrodes made from 30 μm Ni was about 60 percent of theoretical at $2 mA/cm^2$. The utilization increased to 85 percent of theoretical at 2mA/cm2 when the electrode was made using 2 μm nickel. Using the 30μm Ni as a distributed current collector in electrodes containing 2 μm Ni improved the performance of the electrode. An increase in utilization from 85 percent to 92 percent at 2 $mA/cm^2$ was seen when the capacity ratio of 30 μm Ni to NaCl was 1:1.

A myriad of metal particle morphologies exist between submicron and 5 μm sizes, including balls, filaments, chain structures and ball-and-chain structures. It was found that these different morphologies present equally viable alternatives as metal particle types. Generally, metals including nickel, iron, cobalt, chromium and manganese can be employed at sizes ranging from submicron size to 100 μm. Nickel seems to display the highest power capabilities, however, due to its higher electromotive force values versus sodium, compared to the other metals. Nickel systems also have a broad operating temperature range of 250° C. to 400° C.

Using this technique, the new high performance electrodes can be fabricated with higher capacity density (0.40–0.55 $Ah/cm^3$) than the state-of-the-art electrodes (0.25–0.35 $Ah/cm^3$) and still have significantly lower resistivities (0.5 $\Omega cm^2$) than the state-of-the-art electrode 1.5 $\Omega cm^2$).

TABLE 1

| | | | Effect of metal and NaCl particle sizes on cell performance values | | | | | |
|---|---|---|---|---|---|---|---|---|
| Ni size | Ni geom. | NaCl size | Loading density, $Ah/cm^3$ | Vol % Ni | Thickness, mm | Rate C,D* | % Util. | ASI 15 sec, 20% $\Omega cm^2$ |
| 2–5 μm | sphere | 10 μm | 0.45 | 18 | 2 | 8,8 | 100 | 1.24 |
| 2–5 μm | sphere | −60 to +100 mesh | 0.40 | 17 | 2 | 8,4 | 84 | 0.50 |
| 2–3μ | filament | −325+ | 0.40 | 15 | 4 | 8,8 | 99 | 0.86 |

*Charge rate (C) and discharge rates (D) in hours
+30%-325 and remainder −270 to +325 mesh
Temperature = 300° C.

PORE DEVELOPMENT

Using certain size NaCl particles during electrode fabrication creates uniform pores in the electrode upon initial charging that will facilitate electrolyte access to the cathodic redox reaction sites.

Particle sizes for the NaCl vary, however, depending on the electrode thickness desired. Generally, NaCl particle sizes can be selected from −40 to +1250 mesh sizes. Within this range, subranges are used and selected from the exemplary group consisting of −40 to +60 (250−420 μm), −60 to +100 (149−250 μm), −100 to

ELECTRODE FABRICATION

Obvious variations to the following technique will yield results similar to those disclosed below. While the following exemplary fabrication technique utilizes nickel (Ni) as the metal constituent in the cathode, other metals, including those noted above, can be used.

Annular, high-loading-density $NiCl_2$ electrodes (0.4–0.45 Ah/cm3) were made from a mixture of 2 μm Ni (99.99%) and 149 to 250 μm (approximately −60 to +100 mesh size) NaCl in the capacity ratio of 3:1. A 3:1 capacity ratio indicates that one-third of the total amount of the metal present reacts with the alkali-metal halide. In this fabrication process, capacity ratios ranging from 4:1 to 2:1 can be employed. Blending of metal particles with alkali-metal halide particles can be effected in a number of ways, including, but not limited to, vibratory-milling, V-milling, ball-milling, and roll-milling. In one embodiment of the invention, the nickel and NaCl particles were vibratory milled in methanol with zirconia media for two hours.

After drying, the mixture was pressed into annular electrodes containing approximately 12 to 20 volume-percent nickel using a specially designed die. Alternatively, the Ni/NaCl mixture is pressed onto a nickel rod which serves as a voltage/current lead and facilitates the handling of the electrode. Another method of shaping the mixture involves confining the mixture in a beta-alumina tube.

The electrodes were then sintered under 5 percent hydrogen in helium for 14-16 hours at 550°-650° C. Good results were also obtained at sintering temperatures ranging from approximately 700° C. to 800° C. for approximately 1 hour. It has been found that a sintering temperature of 780° C. for 1 hour produces good results. Sintering is typically effected at between 500.° C. and 900° C. for approximately 3 minutes to 24 hours under a low oxidation atmosphere. Aside from the 5 percent hydrogen in helium, a variety of other types of atmospheres can be employed, including 100 percent hydrogen, 100 percent helium, nitrogen streams, a myriad of water-content gases, and generally atmospheres with low oxidation characteristics. Atmospheres that can be utilized in the instant invention contain between $10^{-1}$ and $10^{-35}$ atmospheres of oxygen.

After cooling, the electrodes were removed and placed in a helium-atmosphere glovebox. The electrodes were tested using $\beta''$-alumina tubes with boron nitride spacers which acted as centering devices. An intimately-ground mixture of $NaAlCl_4$ and sulfur (two weight-percent) was added to the $\beta''$-alumina tube. After heating to 260° C., more $NaAlCl_4$ was added until the level of the molten salt was above the level of the electrode. After vacuum impregnation, the cell was sealed and cycled at 260.° C. between about 2.1 V and 2.85 V. The performance data obtained from this electrode is given in Table 2 below. Even at very high discharge current densities (100 mA $cm^2$) and high discharge rates (38-min rate), the utilization of active materials was at least 85% of theoretical.

The 18 volume percent nickel electrode (0.5 Ah/$cm^3$) had very high utilization of NaCl when cycled at different charge and discharge rates. As seen from the data in Table 2, below, the charge current density seems to have a greater affect on NaCl utilization than does discharge current density. For example, with a discharge current density of 12 mA/$cm^2$ (about a C/5 rate) and a charge current density of 12 mA/$cm^2$, 93% of theoretical NaCl capacity can be used. When the charge current is raised to 25 mA/$cm^2$, the NaCl utilization is only 78%. On the other hand, when the discharge current density is 25 mA/$cm^2$ and the charge current density is 12 mA/$cm^2$, 85% of NaCl capacity is utilized.

TABLE 2

NaCl Utilization of Sintered 18-vol %-Ni, 2.6-mm-thick $NiCl_2$

| Charge Current Density (mA/$cm^2$) | Discharge Current Density (mA/$cm^2$) | Discharge Rate | Utilization (% of theoretical NaCl) |
|---|---|---|---|
| 3 | 6 | C/10 | 85 |
| 6 | 12 | C/5 | 100 |
| 12 | 12 | C/5 | 93 |
| 25 | 12 | C/5 | 78 |
| 12 | 25 | C/2.5 | 85 |
| 8 | 50 | C/1.25 | 90 |
| 8 | 100 | 1.6C | 85 |

SULFUR ADDITION

Sulfur enhances the utilization of NaCl in the electrode at all discharge current densities. In cell studies conducted at 260° C. and the C/8 charge rate, marked effects of the sulfur additive and the volume-percent nickel used in the electrode were observed. These effects are shown in Table 3, below. For example, there was a 95% utilization of materials at the C/2 discharge rate in the sulfur-containing 18 volume-percent nickel electrode as compared to 50% in a similar electrode without sulfur. Sulfur seems to enhance the charge acceptance of the nickel electrode by, perhaps, retarding nickel particle growth or by changing the chemistry of the electrode.

TABLE 3

Performance Data of $NiCl_2$ Electrodes

| Temp., °C. | Charge Rate | Discharge Rate | Utilization, % of Theoretical NaCl | | | |
|---|---|---|---|---|---|---|
| | | | 16% Ni 2% S[a] | 18% Ni 2% S | 18% Ni | 20% Ni 2% S |
| 220 | C/8 | C/8 | 37 | 64 | 32 | 62 |
| 220 | C/8 | C/4 | 37 | 55 | 30 | 57 |
| 220 | C/8 | C/2 | 38 | 60 | 28 | 53 |
| 260 | C/8 | C/8 | 71 | 100 | 55 | 80 |
| 260 | C/8 | C/4 | 66 | 100 | 53 | 78 |
| 260 | C/8 | C/2 | 66 | 95 | 50 | 79 |
| 260 | C/4 | C/8 | 59 | 76 | 23 | 68 |
| 260 | C/2 | C/8 | 40 | 60 | 8 | 55 |
| 300 | C/8 | C/8 | 75 | 100 | 45 | 85 |
| 300 | C/8 | C/4 | 69 | 100 | 43 | 80 |
| 300 | C/8 | C/2 | 59 | 97 | 42 | 78 |

[a]Ni in vol %, S in wt %

In the 20 volume-percent nickel electrode (with sulfur), utilization of the active materials was not as good as that of the 18 volume-percent nickel electrode with sulfur. At the C/2 discharge rate, the 20 volume-percent nickel electrode utilized 79 percent of the active materials. The 18 volume-percent nickel electrode utilized 95 percent. This variance is due to differences in porosity of the two electrodes. Increasing the temperature to 300° C. had little or no effect on the performance of the 20 volume-percent nickel electrode (78 percent utilization). The $ASI_{15secs}$ values after current interrupt of the 18 volume-percent nickel electrode with sulfur at 20 percent of theoretical $NiCl_2$ utilization was found to be 1.6 $\Omega cm^2$ at 260° C.

Temperature also effects ASI. In the 18 volume-percent electrode without sulfur, the $ASI_{15sec}$ measurement decreased as the temperature was raised. At 20 percent of theoretical $NiCl_2$ utilization, the 15 second measurements at 220°, 260°, and 300° C. were about 6.1, 3 and 2.8 $\Omega cm^2$, respectively. In the 20 volume-percent nickel electrode with sulfur and at 20% of theoretical $NiCl_2$ utilization, the 15 second measurements at 220°, 260° and 300° C. were about 5.2, 2.7 and 1.6 Ωcm², respectively.

Generally, thin electrodes (1.0 mm to 3.0 mm) performed better than thick ones at a given current density. However, within this range, the 18 volume-percent nickel electrode, at 2.5 mm thickness performed better than did the 20 volume-percent nickel electrode at 2.0 mm thickness. At 2 mA/cm², the 18 volume-percent nickel electrode had a discharge utilization of 100 percent of the theoretical NaCl capacity; under similar conditions, the 20 volume percent-Ni electrode achieved only 75 percent utilization of the theoretical NaCl. $NiCl_2$ electrode thicknesses of between 1.5 mm and 2.5 mm showed good results. Electrodes having a wide range of thicknesses can be fabricated by the invented method to obtain favorable performance values.

While the invention has been described with reference to details of the illustrated embodiment, these details are not intended to limit the scope of the invention as defined in the appended claims.

The embodiment of the invention in which an exclusive property or privilege is claimed is defined as follows:

1. A method of fabricating a positive electrode for a metal chloride battery comprising the steps of:
   selecting sodium chloride particles from a classified size range of 149-250 microns;
   mixing said sodium chloride particles with metal particles selected from a classified size range to create a mixture, said mixture of sodium chloride particles and metal particles comprising a capacity ratio of 1:2 to 1:4 and
   rigidifying the mixture.

2. A method as recited in claim 1 wherein the metal is selected from the group consisting of nickel, iron, cobalt, chromium and manganese.

3. A method as recited in claim 1 wherein the metal particle size ranges from approximately submicron size to 100 microns.

4. A method as recited in claim 1 wherein the metal particle size is between approximately 2 microns and 30 microns.

5. A method as recited in claim 1 wherein the positive electrode has a thickness ranging from between approximately 1 millimeter and 10 millimeters.

6. A method as recited in claim 1 wherein the positive electrode has a thickness ranging from approximately 2 millimeters to 4 millimeters.

7. A method as recited in claim 1 wherein the mixture is formed into the positive electrode containing approximately 12 volume percent to 20 volume percent of metal.

8. A method as recited in claim 1 wherein the mixture is formed into the positive electrode containing approximately 18 volume percent of metal.

9. A method as recited in claim 1 wherein the step of rigidifying the mixture further comprises the step of shaping the mixture into the positive electrode by pressure.

10. A method as recited in claim 1 wherein the step of rigidifying the mixture further comprises the step of shaping the mixture into a positive electrode by confining the mixture in a beta-alumina tube.

11. A method as recited in claim 1 wherein the step of rigidifying the mixture further comprises the steps of sintering the mixture at a temperature of between approximately 500° C. and 900° C. under a low oxidation atmosphere for approximately 3 minutes to 24 hours.

12. A method as recited in claim 1 wherein the step of rigidifying the mixture further comprises the steps of sintering the mixture at a temperature of between 700° C. and 800° C. under a low oxidation atmosphere for approximately 1 hour.

13. A method as recited in claim 1 wherein the step of rigidifying the mixture further comprises the steps of sintering the mixture at a temperature of between 500° C. and 900° C. under a 5 percent hydrogen in helium atmosphere for approximately 3 minutes to 24 hours.

14. A method of fabricating electrodes for use in metal chloride batteries comprising:
   selecting sodium chloride particles having a size range of 149 to 250 microns;
   mixing said sodium chloride particles with 2-5 micron nickel in a capacity ratio of 1:2 to 1:4;
   pressing said mixture into annular electrodes whereby the electrode comprises approximately between 12 volume percent and 20 volume percent nickel; and
   sintering the electrodes under 5 percent hydrogen in helium for approximately 3 minutes to 24 hours at approximately 500° to 900° C.

15. A metal halide cathode, prepared from sodium chloride particles of 149-250 micron size, comprising pore diameters ranging in size from about 50 microns to 500 microns and including nickel metal in a capacity ratio to sodium chloride of 4:1 to 2:1.

16. A metal halide cathode as recited in claim 15 wherein the pore diameters range in size from 100 microns to 150 microns.

* * * * *